May 10, 1938.  C. H. BILLS  2,117,111
TANK FLANGED PIPE COUPLING
Filed June 9, 1937
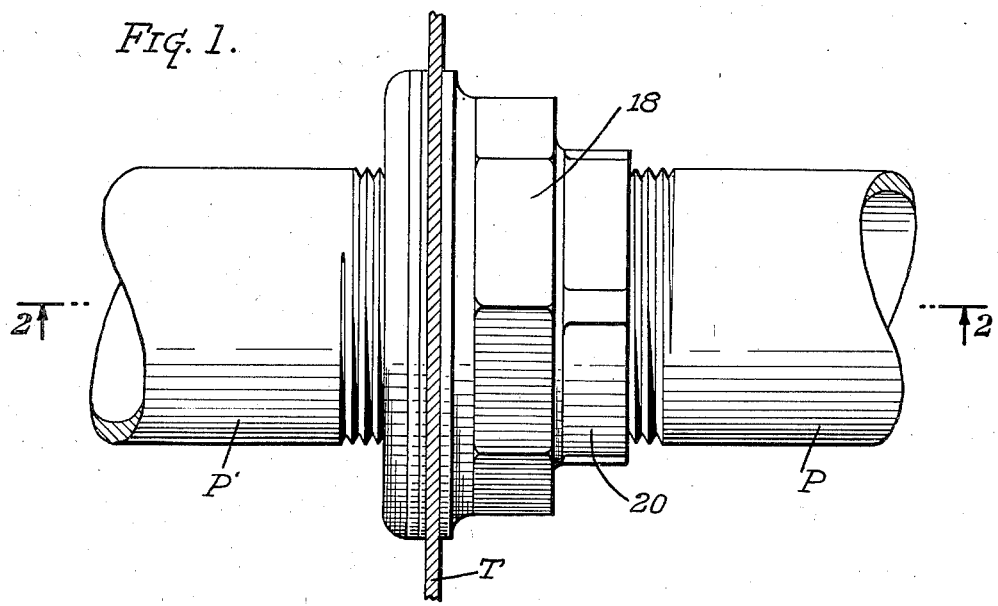
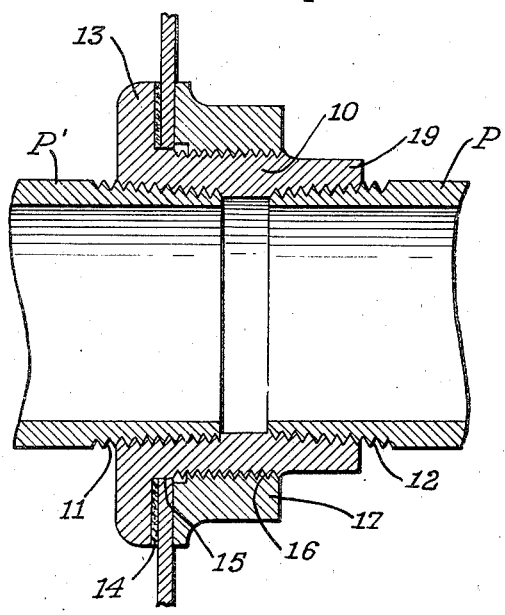 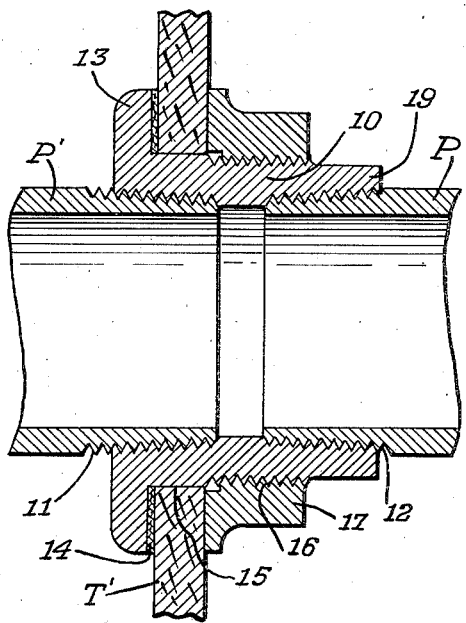
Inventor.
C. H. Bills.
By Hazard and Miller
Attorneys.

Patented May 10, 1938

2,117,111

UNITED STATES PATENT OFFICE 2,117,111

TANK FLANGED PIPE COUPLING

Claud H. Bills, Maywood, Calif., assignor of one-half to Colin W. Timmons, Alhambra, Calif.

Application June 9, 1937, Serial No. 147,296

2 Claims. (Cl. 285—50)

This invention relates to improvements in tank flanged pipe couplings.

An object of the invention is to provide an improved tank flanged type coupling which can be easily installed, and tightened in position without the requiring of bolt holes and the like to be drilled in the tank wall and which will enable a pipe to be connected to a tank without danger of loosening or leakage.

Heretofore in connecting pipes with tanks, such as for example oil storage tanks, bolted couplings have been generally employed which require the insertion of bolts through the tank walls for connecting parts of the coupling together and tightening them against the opposite sides of the tank wall. With such constructions leakage around the bolts must be prevented and considerable care is required to have the bolt holes properly arranged for alignment with the bolt holes in the coupling. The present construction obviates the necessity of such bolt holes, thus doing away with danger of leakage around them and the necessity of securing perfect alignment.

Another object of the invention is to provide a tank flanged pipe coupling which is of simple and durable construction and which can be easily manufactured and quickly installed. In this connection the construction is such that the coupling is self-tightening at the time that the pipe is connected thereto.

With the foregoing and other objects in view, which will be manifest in the following detailed description and specifically pointed out in the appended claims reference is had to the accompanying drawing for illustrative embodiments of the invention, wherein:

Figure 1 is a vertical section through a tank wall illustrating the coupling in applied position thereon and in side elevation, two pipes being indicated as having their ends connected to the coupling;

Fig. 2 is a vertical section taken substantially along the line 2—2 of Fig. 1; and Fig. 3 is a view similar to Fig. 2, illustrating a slight modification.

Referring to the accompanying drawing wherein similar reference characters designate similar parts throughout, T designates the steel wall of a tank such as for example an oil storage tank to which it is desired to connect an external pipe P and under some circumstances an internal pipe P'. The improved tank flanged pipe coupling is formed of a single, one-piece body 10 which preferably is internally threaded with right hand threads as indicated at 11 and 12 for the reception of the ends of the pipes P' and P, respectively. In most tank construction it is merely desirable to connect an external pipe P to the tank but in certain installations it sometimes is desirable to also connect an internal pipe P'. For this reason, the body is internally threaded at both ends so as to take care of both types of installation. One end of the body is externally flanged, as indicated at 13, this flange being adapted to be tightened against a gasket 14 against the side of the tank wall T. The hollow body is insertable through an opening 15 formed in the tank wall and the exterior of the body immediately against the flange 13 is preferably cylindrically shaped so as to fit fairly closely the opening. Adjacent flange 13 the exterior of the body is externally threaded as indicated at 16 for the reception of a nut 17, the outside of which is provided with flats 18 for the application of a tightening wrench which tightens the nut against the outside of the tank wall T. The body is provided with an externally reduced end 19 which is externally flatted as indicated at 20 for the application of a wrench and this reduced end is sufficiently small so that the nut 17 can be freely passed thereover. In other words, the diameter across the points as distinguished from the flats of the reduced end is slightly less than the diameter of the threads 16.

In the preferred form of construction when the threads 11 and 12 are right hand threads in conformity with general practice with respect to the threading of pipe, the threads 16 are oppositely directed, that is they are left hand threads.

The advantages of the improved pipe coupling are as follows: When it is desired to connect an external pipe P to a tank it is merely necessary to cut or form a hole 15 in the tank wall. The body of the coupling is then inserted through this opening and the nut 17 is slipped over the reduced end 19 and screwed onto threads 16. By applying a wrench to the flats 20, the body may be held against rotation while the nut is being tightened up by the application of a wrench to its flats. In this way the coupling can be tightened against the opposite sides of the tank wall. The pipe P can then be screwed onto the body of the coupling and where an internal pipe installation is desired the pipe P' can also be screwed onto the body of the coupling.

As it is customary practice for pipe fitters to apply large wrenches to the pipe in tightening it up, it will be noted that when the threads 16 are left hand threads that tightening up of pipe P does not bring about a loosening of the coupling. In this respect the coupling is self-tightening in that application of greater forces to pipe P in tightening it merely serve to cause the nut 17, having left hand threads, to be tightened with greater force against the tank wall.

In Fig. 3 there is illustrated a slight modification adapting the coupling to tanks having wooden walls. The construction therein illustrated is the same as that previously described with the exception that that portion of the exterior of the body which is immediately adjacent the flange 13 is made cylindrical and of sufficient length to accommodate the thickness of the tank wall T'.

Various changes may be made in the details of construction without departing from the spirit or scope of the invention as defined by the appended claims.

I claim:

1. A flanged pipe coupling for tanks and the like comprising a one-piece tubular body insertable through an opening in the tank wall, said body being internally threaded for the reception of at least one threaded pipe end, said body having an external flange adapted to be tightened against one side of the tank wall and an externally threaded portion adjacent the flange for the reception of a nut adapted to be tightened against the other side of the tank wall, a nut on the externally threaded portion, said body presenting an externally reduced end remote from the flange which is sufficiently reduced to enable the nut to be passed thereover and which is shaped for the application of a wrench.

2. A flanged pipe coupling for tanks and the like comprising a one-piece tubular body insertable through an opening in the tank wall, said body being internally threaded for the reception of at least one threaded pipe end, said body having an external flange adapted to be tightened against one side of the tank wall and an externally threaded portion adjacent the flange for the reception of a nut adapted to be tightened against the other side of the tank wall, a nut on the externally threaded portion, said body presenting an externally reduced end remote from the flange which is sufficiently reduced to enable the nut to be passed thereover and which is shaped for the application of a wrench, the threads between the nut and the body being oppositely directed to those on the interior of the body so that tightening of a pipe end in the body will have the effect, if any, of tightening the nut against the tank wall.

CLAUD H. BILLS.